United States Patent [19]

Drzemala, deceased

[11] Patent Number: 4,665,676
[45] Date of Patent: May 19, 1987

[54] FRAME

[75] Inventor: Jean S. Drzemala, deceased, late of La Hulpe, Belgium, by Elizabet Van Bellingen and Stanislas Drzemala, legal representatives

[73] Assignee: Liliane Germaine Gryson, Etterbeek, Belgium

[21] Appl. No.: 813,781

[22] Filed: Dec. 27, 1985

[30] Foreign Application Priority Data

Dec. 28, 1984 [BE] Belgium .............................. 0/214277

[51] Int. Cl.$^4$ ............................ E04C 2/38; G09F 1/12
[52] U.S. Cl. ........................................ 52/656; 40/155; 403/402
[58] Field of Search .................. 52/656; 160/381, 353; 40/155, 157, 152; 403/402

[56] References Cited

U.S. PATENT DOCUMENTS

| | | | |
|---|---|---|---|
| 2,679,665 | 6/1954 | Beard | 52/656 X |
| 3,380,218 | 4/1968 | Fabich | 52/656 |
| 4,024,691 | 5/1977 | Hansen et al. | 52/656 |
| 4,068,967 | 1/1978 | Hoodis | 52/656 X |
| 4,183,693 | 1/1980 | Berdan | 52/656 X |
| 4,428,135 | 1/1984 | Sobel | 403/402 X |

FOREIGN PATENT DOCUMENTS

| | | | |
|---|---|---|---|
| 2396885 | 3/1979 | France | 403/402 |
| 438624 | 11/1935 | United Kingdom | 40/155 |
| 695668 | 8/1953 | United Kingdom | 40/155 |

Primary Examiner—J. Karl Bell
Attorney, Agent, or Firm—Cushman, Darby & Cushman

[57] ABSTRACT

There is described a frame comprised of sectional shapes and comprising assembly means joining same in every junction location thereof, and hanging means, the sectional shapes each having two lengthwise projections wherebetween the articles to be framed are arranged, said means being comprised in each frame corner, on the one hand of an element with two legs the angle of which is equal to the frame inner angle as formed by two sectional shapes where same join, each said legs being so designed as to cooperate by interlocking with the projection from one both said sectional shapes, and on the other hand of means so arranged on the legs as to fix each leg relative to the corresponding projection.

12 Claims, 12 Drawing Figures

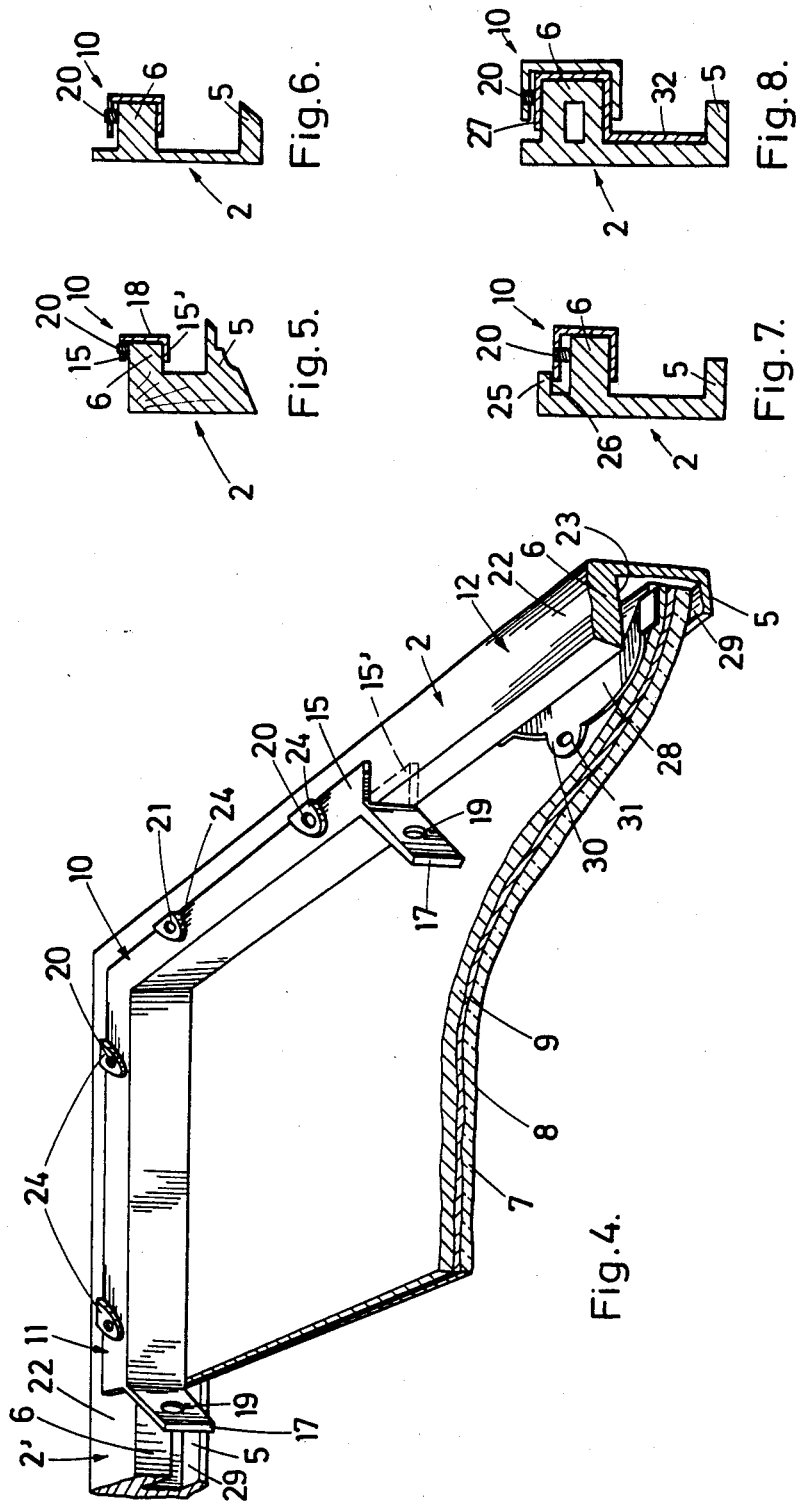

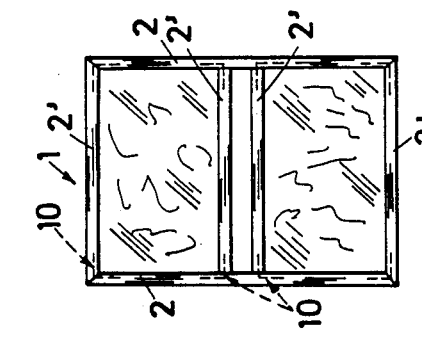
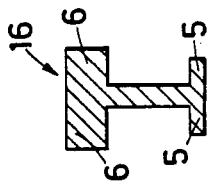
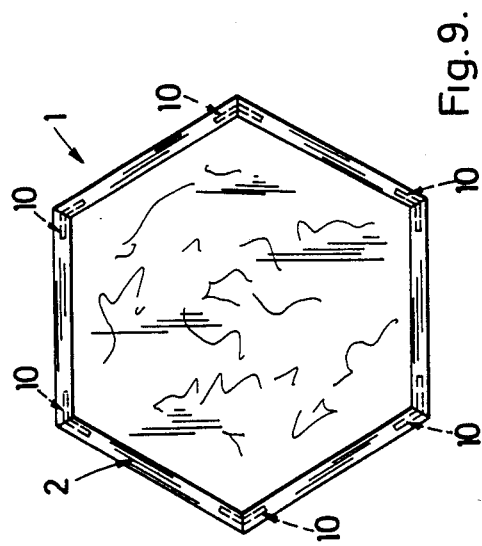
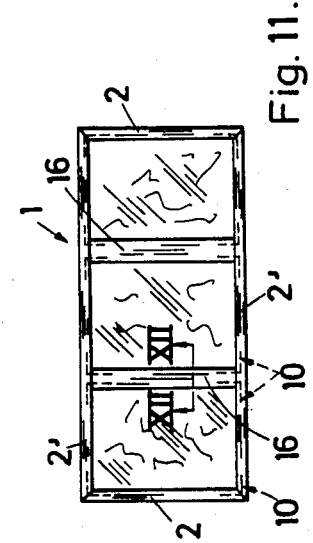

FRAME

This invention relates to a frame comprised of sectional shapes and provided with assembly means joining said sectional shapes in every junction area thereof, and hanging means.

The frames presently known and obtained from sectional shapes, are provided with assembly means comprised of corner pieces fitting into corresponding recesses provided in said sectional shapes, the frames being assembled by means of pressure screws arranged in screw-threaded holes in the sectional shape, which bear on the corner pieces to lock same inside said recesses. Such known frames which are necessarily prefabricated to have adjacent each end of those sectional shapes which comprise the frames, said tapped holes, have for main drawback quite specific sizes, that is such frames may only be used to frame articles which have such specific sizes. Moreover said frames have also for drawback during the mounting thereof and mostly when the frames have substantial sizes, that it is sometimes difficult to join the last sectional shape which has two corner pieces, to the already-assembled sectional shapes wherein the articles to be framed are already located. Moreover, the frames may only be in quadrilateral shape with four right angles.

This invention has for object to obviate such drawbacks and notably to provide a frame the sectional shapes of which may be adjusted accurately as a function of the articles to be framed, and this whatever be the size of said articles, said frame the assembly of which is markedly easier than the known frames, having for advantage that it may have on the one hand any regular or irregular shape, and on the other hand be divided by cross-bars to frame articles arranged next to one another, side-by-side or not.

For this purpose according to the invention, the sectional shapes comprising the frame each have two length-wise parallel projections facing inwards relative to the frame and between which the articles to be framed are arranged, the assembly means being comprised in each frame corner, on the one hand of a two-leg element the angle of which is equal to the frame inner angle as formed by two sectional shapes in that location where they join one another, each said legs the cross-section of which is substantially U-shaped, being so designed as to cooperate by interlocking with that projection of one both said sectional shapes which is nearest the frame back, and on the other hand of means so arranged on the element legs as to lock at least the one flange from each leg relative to the corresponding projection.

In an embodiment of the invention, the sectional shapes have the same cross-section and said two-leg elements are identical.

In an advantageous embodiment of the invention, said hanging means are comprised of at least one member provided on each said two-leg element and fixed relative thereto.

In an advantageous embodiment of the invention, the sectional shapes are made from synthetic material, such as a plastic material, each sectional shape comprising a rigid metal shape so arranged as to correspond to the shape of that projection nearest the frame back and to grip same to avoid distortions of the synthetic material sectional shapes.

In a particularly advantageous embodiment of the invention, the synthetic material being used is polymethyl-methacrylate which is notably known under the name "Plexiglass", the frame advantageously comprising between both projections of each sectional shape, over the whole length thereof, an opaque material strip the width of which corresponds to the space lying between both projections, said strip having for purpose to conceal the corresponding edge of the articles to be framed.

Other details and features of the invention will stand out from the following description, given by way of non limitative example and with reference to the accompanying drawings, in which:

FIG. 4 is a part perspective view on a larger scale than FIGS. 1 to 3, showing a particular embodiment of the two-leg element from cast metal, said element being associated with two sectional shapes to form one frame corner.

FIGS. 5 to 8 show cross-sections of various sectional shapes which may be used to obtain the frame according to the invention, said figures further showing in cross-section, the one leg from the assembly element.

FIGS. 9 to 11 are diagrammatic elevation views of frames according to the invention.

FIG. 12 is a section on large scale, along line XII—XII in FIG. 11.

In the various figures, the same reference numerals pertain to identical or similar elements.

Figure 1:
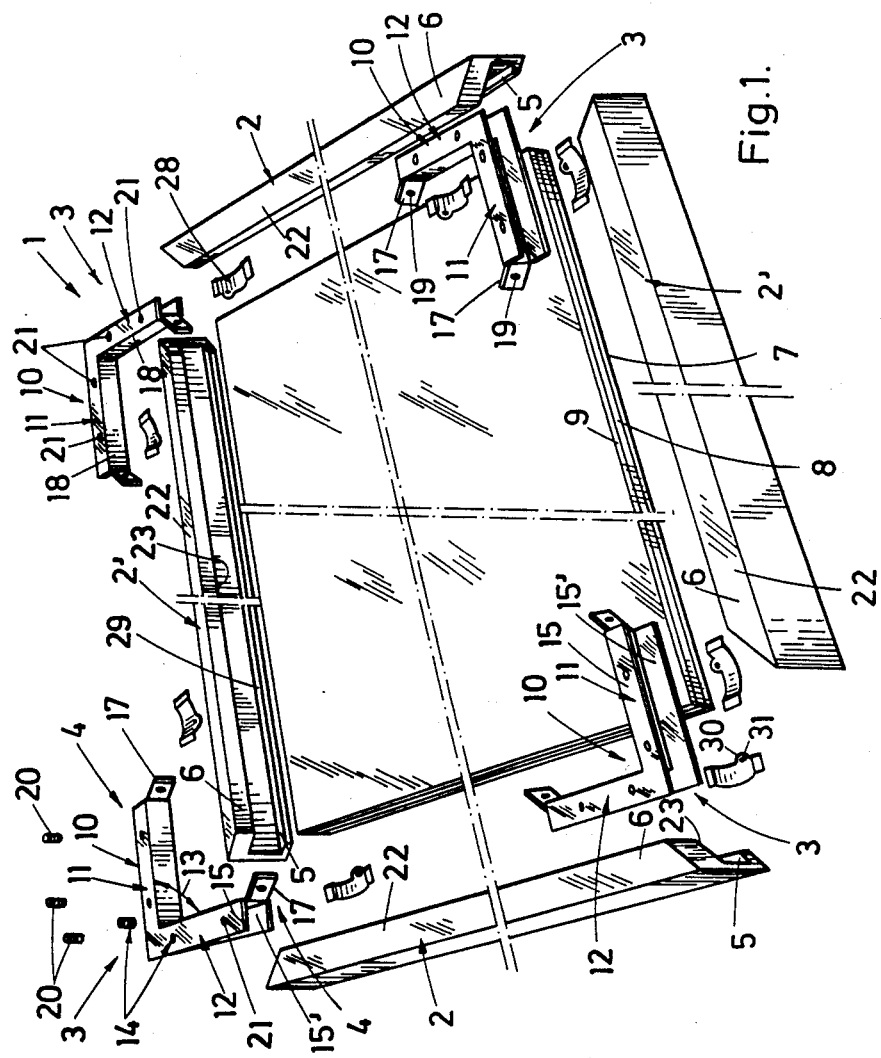
FIG. 1 is a perspective view with parts broken away, showing the frame components and the articles to be framed in unassembled condition.

The frame 1 according to the invention, as shown in the drawings, is comprised of sectional shapes 2, 2' and has assembly means 3 joining said sectional shapes 2, 2' in every joining location thereof and in every frame corner, as well as hanging means 4.

The sectional shapes 2, 2' being used to obtain the frame 1 as opposed to said well-known frames which make use of corner pieces and are essentially from metal, may be made from any material, such as wood, metal, synthetic material. Said sectional shapes 2, 2' which may have a very simple cross-section, each have two lengthwise parallel projections 5 and 6 which face inwards relative to the frame and between which the articles to be framed are arranged, such as glass 7, picture 8, frame back 9. The means 3 for assembling the frame are comprised in each frame corner, on the one hand of an element 10 with two legs 11 and 12 the cross-section of which is U-shaped and the angle 13 of which is equal to the inner frame angle alpha (see FIGS. 3 and 9) as formed by two sectional shapes 2 and 2' in the location of the junction 13' thereof, each said legs 11 and 12 being so designed as to cooperate by interlocking, with that projection 6 from the one both sectional shapes 2, 2', nearest the frame back (see FIG. 2), and on the other hand of means 14 so arranged on said legs 11 and 12 as to fix at least the one flange 15, 15' of each leg 11, 12 relative to the corresponding projection 6 of the sectiona shapes 2, 2'.

Said system for assembling the sectional shapes 2 and 2' by means of elements 10, allows as the frame is being assembled, to close accurately the joints present between said sectional shapes where they join, and to retain such joints perfectly and permanently closed when the assembly has been completed, which is not always the case with the present systems.

Besides such substantial advantage, the sectional shapes 2 and elements 10 according to the invention have the even more important advantage due to the means 14 insuring the assembly and fixing of the sectional shapes 2 and elements 10 relative to one another, being arranged on said elements 10, that said sectional shapes 2 may be used as such without having to provide thereon at pre-determined spacings, means contributing to the assembly thereof. There results therefrom that to obtain the frames according to the invention, it is enough to cut the sectional shapes to suitable lengths which correspond accurately to the size of the work to be framed, while with the present systems making use of corner pieces, it was necessary to remain with the use of prefabricated sectional shapes cut to standard sizes.

The frame according to the invention as opposed to present frames which always are in quadrilateral shape with right angles, may have any regular or irregular polygonal shape, be it concave or convex. Said frame may further have as shown notably in FIGS. 10 and 11, cross-bars 16 and be used to form for example, panels wherein the works or pictures 8 lie side-by-side or not.

The sectional shapes 2 which are used to make those frames 1 which do not have said cross-bars 16, have the same cross-section and when said frames are in quadrilateral shape with right angles (square or rectangle), the elements 10 are identical, as well as when the frames are in the shape of regular polygons, such as pentagon, hexagon, etc. It is then only necessary to make frames with all kinds of sizes, to provide two sets of elements 10, a first element set the legs 11 and 12 of which have a shortened length for the small and medium size frames, and a second set with longer legs for large size frames. As regards the cross-bars 16, same have a cross-section which corresponds to the sectional shapes 2, and have relative to a symmetry plane passing through the cross-bar lengthwise axis, two pairs of opposite lengthwise projections 5 and 6 (see FIG. 12).

Another particularly important advantage of the frame according to the invention relative to known frames, lies in the frame hanging means 4 being included in the assembly elements 10, which allows not only to lower the number of parts required to make a frame and the mounting operations thereof, but also to frame the work or picture without necessarily having to take into account the direction it will be hung along.

Figure 2:
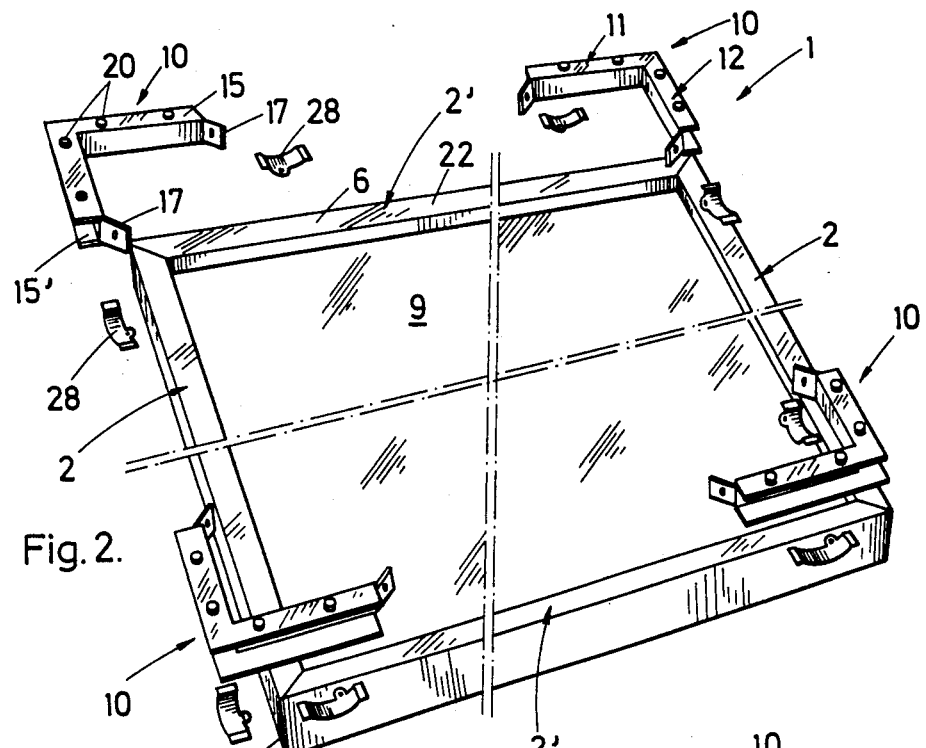
FIGS. 2 and 3 are views similar to FIG. 1, showing the frame components and the articles to be framed during assembly.
Figure 3:
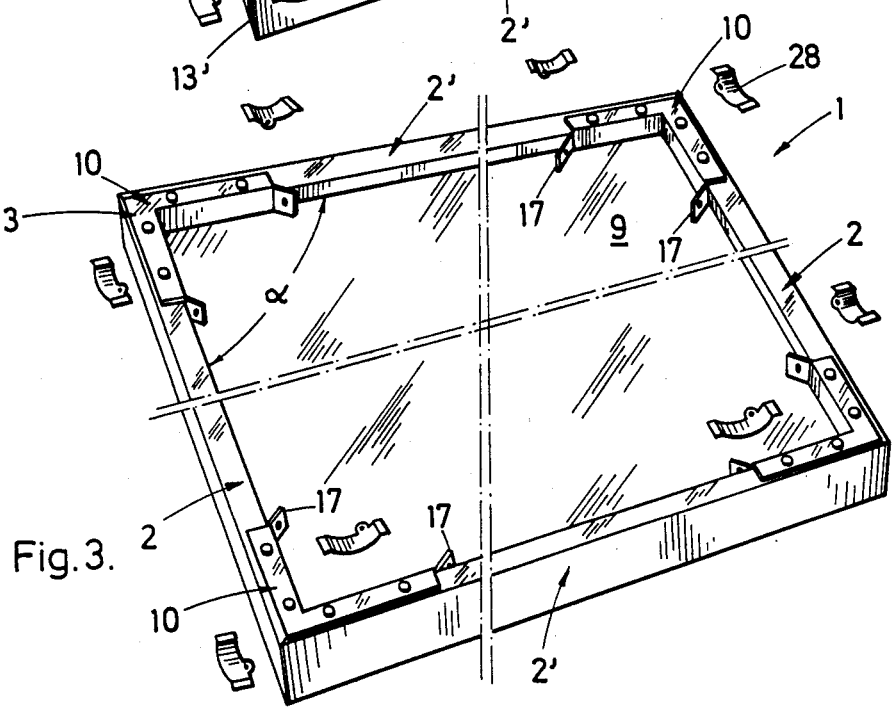

In the embodiment as shown in FIGS. 1 to 4, the frame 1 is of conventional type in the shape of quadrilateral with right angles, and is comprised of four sectional shape lengths, equal two by two, which are mitre-cut to the accurate size of the work to be framed, the assembly means 10 being corner-pieces. Mounting the frame may be made in two ways, that is either as shown in FIG. 2, by first arranging the four sectional shapes 2, 2' about the articles to be framed while engaging same between the projections 5 and 6 from each sectional shape, and by closing the joints in the four corners, then by assembling the sectional shapes one corner at a time, by means of an assembly element 10, or by first arranging two succeeding sectional shapes about the articles to be framed, and by assembling said shapes by means of an element 10 to form one frame corner, by laying the third sectional shape and by fixing said shape to one both said sectional shapes by means of another element 10 to form the second corner of said frame, and finally by laying the fourth sectional shape and by joining same succeedingly to two already-laid sectional shapes, with two other elements 10, to form the third and fourth corners of said frame.

As shown notably in FIGS. 1 to 4, said hanging means 4 are advantageously comprised of a lug 17 located on the free end of each said legs 11 and 12 of assembly means 10, said lug being formed by an extension of web 18 from the U comprising the legs and lying at an angle to said web to be facing inwards relative to the frame, each said lugs 17 having an opening 19 allowing securing therein the end of a hanging cable.

Said means 14 for fixing the elements 10 relative to sectional shapes 2, 2' to obtain the frame assembly, are comprised as shown in FIGS. 1 to 4, of two pressure screws 20 arranged in two tapped holes 21 provided in each one of the flanges 15 of the legs 11 and 12 from assembly means 10 and the axes of which lie at right angle to said flanges 15. The screws 20, of hollow six-sided needle type, are intended to bear on the sides 22 of projections 6 from sectional shapes 2, 2', and when said screws are tightened, they force the flanges 15 away from said sides 22 to press the whole surface area of flanges 15' against the sides 23 of said projections 6, which insures a strong assembly in all the frame corners, while retaining perfectly closed the joints of sectional shapes 2, 2'.

To reinforce the elements in the area of tapped holes 21, same are advantageously provided as shown in figure 4, with reinforcements 24. In that case where said elements 10 are made from cast metal, the lugs 17 and reinforcements 24 are directed along the same direction and in parallel relationship with the bisectrix of that angle 13 formed by the legs 11 and 12 of elements 10, to make possible the manufacturing with simple moulds and make removing from the moulds easier.

To avoid distorting the elements 10 when tightening the screws 20, the sectional shapes 2 may have as shown in FIG. 7, in parallel relationship with projection 6, a rib 25 facing inwards relative to the frame and lying opposite projection 5. The spacing between projection 6 and rib 25 is larger than the thickness of flanges 15 of legs 11 and 12 from elements 10, and said spacing is such that when the screws have been tightened and the flanges 15' of flanges 11 and 12 bear on the sides 23 of projections 6, while the flange 15 bear on the sides 26 of the ribs 25. The size of the ribs 25 as considered at right angle to the sectional shape lengthwise axis, is such that the screws 21 remain visible when the flanges 15 of the legs 11 and 12 are engaged between said projections 5, 6 and ribs 25.

When the sectional shapes 2, 2' are made from synthetic material, such as a plastic material, each sectional shape advantageously comprises a rigid metal shape 27, see FIG. 8, following the shape of projection 6 and gripping same to stiffen the sectional shapes, said shapes 2, 2' being moreover so arranged as to have the pressure screws 20 from elements 10 bearing on the metal sectional shapes 27.

The articles 7, 8 and 9 to be framed are secured between the projections 5 and 6 by pressure springs 28 bearing on the sides 23 from projections 6 and on the frame back 9 to press the glass plate 7 against the sides 29 from projections 5, said springs 28 which are comprised of a leaf, having an outgrowth 30 pierced by an opening 31, which projects from the sectional shapes when the springs are fitted between the projections 5 and 6, and is intended to make handling the springs easier both to fit same between said projections and to remove same therefrom.

The sectional shapes 2, 2' from frame 1 according to the invention are advantageously made from polymethyl-methacrylate, known under the name "Plexiglass", which makes said frame substantially invisible and lets the framed work appear by transparency through the sectional shape projections 5. In this case, there is provided (as shown in FIG. 8), between the projections 5 and 6 from each sectional shape and over the whole length thereof, a strip from opaque material 32 with a width which corresponds to the spacing between said projections, said strips 32 being provided to conceal on the frame side surfaces, the edges of those articles 7, 8, 9 to be framed as well as springs 28.

The frame 1 as shown in FIG. 9, is a hexagonal frame obtained from sectional shapes identical to the above-described ones, said sectional shapes being assembled by means of elements 10 similar to the above-described ones, the angle formed by the legs 11 and 12 from said elements 10 being 120°.

The frame 1 as shown in FIG. 10, is a frame for a plurality of works 8 arranged with a spacing from one another. The sectional shapes 2 and the elements 10 from said frame ar identical to the shapes and elements shown in FIGS. 1 to 4, and the assembly thereof is obtained in the same way.

In the frame 1 as shown in FIG. 11, wherein a plurality of works are arranged side-by-side, the sectional shapes 2, 2' and the elements 10 are identical to the shapes and elements as shown in FIGS. 1 to 4, while the cross-bars 16 the cross-section of which is shown in FIG. 12, each have two pairs of opposed projections 5 and 6, the assembly of said latter frame being obtained in a way similar to the above-described one.

It must be understood that the invention is in no way limited to the above-described embodiments and that many changes may be brought thereto without departing from the scope of the invention as defined by the appended claims.

I claim:

1. Frame comprised of sectional shapes and comprising assembly means joining said sectional shapes in every junction location thereof, and hanging means, in which said frame sectional shapes each have two parallel lengthwise projections, facing inwardly relative to the frame and wherebetween the articles to be framed are arranged, said assembly means being comprised in the inner side of each frame corner, on the one hand of an element with two legs the angle of which is equal to the inner angle of the frame as formed by two sectional shapes in the junction location thereof, each said legs having a substantially U-shaped cross-section to provide two flanges, being so designed as to cooperate by interlocking with that projection from both said sectional shapes nearest the frame back, and on the other hand of means so arranged on the legs as to fix at least the one flange of each leg nearest the frame back relative to the corresponding projection.

2. Frame as defined in claim 1, in which the sectional shapes have the same cross-section.

3. Frame as defined in claim 1, in which said elements with two legs are identical.

4. Frame as defined in claim 2, which is comprised of four sectional shape lengths, equal two by two, the ends of which are mitre-cut, said elements with two legs being in the shape of corner-pieces.

5. Frame as defined in claim 1, in which said hanging means are comprised of at least one member provided on each said two-leg elements and fixed relative to said element.

6. Frame as defined in claim 5, in which each said two-leg elements has two members comprising said hanging means, said members in lug shape being arranged on the free ends of the legs, being comprised of an extension of the U web and forming an angle therewith to face inwards relative to the frame, each said lugs having an opening allowing securing therein the end of a hanging cable.

7. Frame as defined in claim 1, in which said means provided to fix at least one said flanges from each said element legs relative to the corresponding projection, are comprised of at least one pressure screw arranged in a screwthreaded hole provided in that flange nearest the frame back and having an axis substantially at right angle thereto, said pressure screw being so designed as to bear on that side of the projection facing the flange under consideration.

8. Frame as defined in claim 7, in which said flange has in the location of said tapped hole, an overthickness comprising a reinforcement for the element, said overthickness being provided on the flange outer side.

9. Frame as defined in claim 8, in which said two-leg elements are made from cast metal, said lugs as well as the element reinforcements being directed along the same direction and in parallel relationship with the bisectrix of the angle formed by both legs.

10. Frame as defined in claim 1, in which said sectional shapes have in parallel relationship with that projection nearest the frame back, a rib facing inwards relative to the frame and lying opposite the other projection, the spacing between said first projection and said rib being larger than the thickness of the flanges from the legs of said elements, and said spacing is such that when one flange of said legs bears on the projection, the other flange of the legs bears on the rib, while the size of the rib as considered at right angle to the sectional shape lengthwise axis is such that said means provided to fix at least the one flange of each leg relative to the corresponding projection be released relative to said rib.

11. Frame as defined in claim 1, in which the sectional shapes are made from synthetic material, such as a plastic material, each sectional shape including a rigid reinforcing metal sectional shape so arranged as to follow the size of that projection nearest the frame back and to grip same to prevent distortions of the synthetic material sectional shapes.

12. Frame as defined in claim 11, in which the synthetic material being used is polymethyl-methacrylate, notably known under the name "Plexiglass", and including between both projections from each sectional shape, over the whole length thereof, a strip from opaque material the width of which corresponds to the spacing between both said projections, said strip being provided to conceal the corresponding edge of the articles to be framed.

* * * * *